Aug. 20, 1929.   S. A. WIER   1,725,236
WATER SOFTENING DEVICE
Filed May 5, 1928
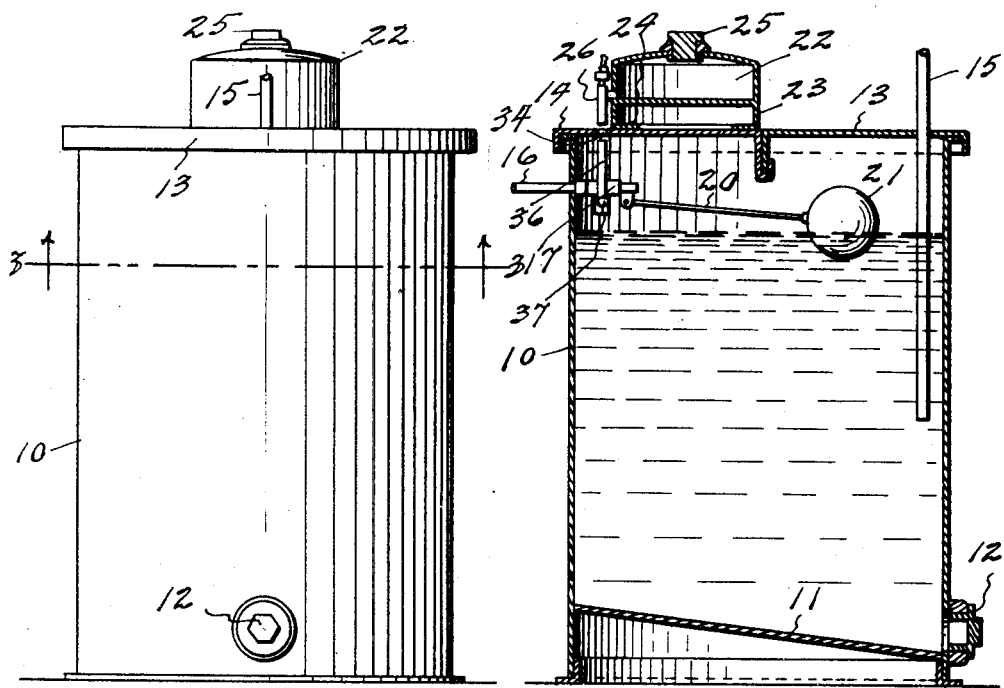
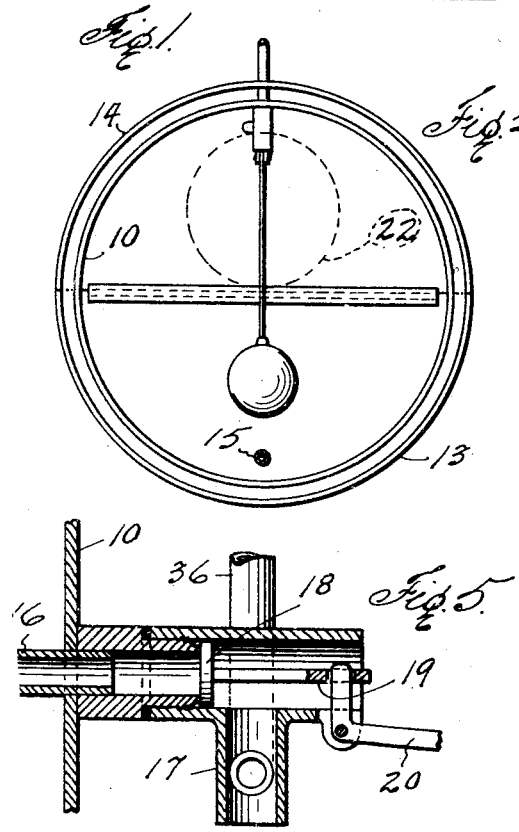
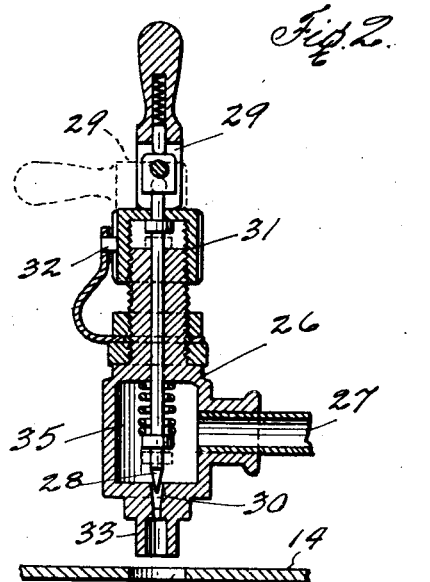
Inventor
S. A. Wier Patented Aug. 20, 1929.

1,725,236

UNITED STATES PATENT OFFICE.

STUART A. WIER, OF DALLAS, TEXAS, ASSIGNOR TO TRIDEX CORPORATION, OF DALLAS, TEXAS, A CORPORATION OF DELAWARE.

WATER-SOFTENING DEVICE.

Application filed May 5, 1928. Serial No. 275,519.

This invention relates to new and useful improvements in water softening devices.

One object of the invention is to provide a simple arrangement whereby a water softening material may be fed to a body of water in such proportions as to properly soften a given body of water, thus making the latter ideal for use in a boiler or other places.

Another object of the invention is to provide a water softening device whereby a softening material may be fed periodically to a body of water, thereby softening said water as it is used.

A still further object of the invention is to provide means for continuously feeding a water softening material into a body of water, whereby the softening operation becomes automatic when once regulated.

An important object of the invention is to provide means for feeding a water softening material directly into a water feed, whereby the said material and the water are commingled as the water is fed, thus more thoroughly mixing the softening material with the water as well as obtaining a more even and constant distribution of said material, which will promote the softening action and assure effective results and which will also practice economy.

A construction designed to carry out the invention will be hereinafter described, together with other features of the invention.

The invention will be more readily understood from a reading of the following specification and by reference to the accompanying drawings, in which an example of the invention is shown and wherein:

Fig. 1 is an elevation of a water tank having a reservoir thereon for containing a water softening liquid, Fig. 2 is a vertical sectional view of the same, Fig. 3 is a horizontal cross-sectional view taken on the line 3—3 of Fig. 1, Fig. 4 is an enlarged sectional view of the feed device, and Fig. 5 is a sectional view of the water supply valve and feed tube.

In the drawings the numeral 10 designates a cylindrical tank having an inclined bottom 11 which facilitates draining and a drain plug 12. A cover comprising sections 13 and 14 respectively, is mounted on the tank.

A suction pipe 15 extends through the section 13, whereby the softened water may be removed from the tank. A water supply pipe 16 extends through the side of the tank just below the cover section 14. A T-shaped valve casing 17 is fastened on the pipe within the tank and has therein a water control valve 18 for cutting off the supply of water to the tank. This valve is of the usual construction used in flush tanks and its stem 19 is connected with a bell crank lever 20 having a float 21 on its outer end. When the tank is supplied to the proper level the float will rise and close said valve and when the water level is lowered said float will fall and open the valve.

The parts which have been described represent a convenient form of water tank with which my invention may be used and it is to be understood that said invention is not to be limited to any particular water tank or the structural details thereof. A proper water softening material supplied to the water in the tank will soften the same so that soft water may be discharged through the pipe 15.

I have found a satisfactory arrangement to include a small reservoir or container 22 mounted on the section 14. It is preferable to support the bottom of the container above the cover section and said container is shown with a depending skirt or apron 23 provided with an inturned annular flange 24, whereby it may be bolted on said cover section. The reservoir has a removable plug or closure 25 in its top so that a suitable water softening liquid may be placed in said reservoir.

The invention residing in the attachment or means for supplying the water softening liquid, any means may be employed for feeding the same to the water. It is desirable to be able to observe the feed of the liquid, particularly where it is advantageous to drop the liquid either periodically or continuously and at pre-determined intervals. To accomplish this an ordinary regulating valve 26 is connected with the reservoir by a short pipe 27 entering said reservoir contiguous to the bottom thereof.

The regulator illustrated includes a needle valve 28 connected with a handle yoke 29 which when raised, as is shown in full lines in Fig. 4, lifts the valve from its seat 30 and when lowered, as shown in dotted lines, causes the valve to seat. The yoke lever is mounted on an adjustable cap 31 held in position by a spring retaining dog 32. By adjusting the cap the lift of the needle valve is controlled and the degree to which the seat 30 is opened is thus regulated. This type of device is very common and a detailed description of the same is not considered necessary.

The regulator has a short spout 33 depending from the valve seat 30 and spaced above a port 34 in the cover section 14. When the regulator is open the softening liquid will flow from the reservoir 22 through the pipe 27 and into the chamber 35 of the regulator. Owing to the small size of the valve seat 30 and its partial closure by the needle valve, the passage of the liquid through the spout will be retarded and it will escape in drops which will fall through the port 34 and these drops may be observed and counted if desired.

From the foregoing it will be seen that the water softening liquid may be supplied in desired quantities and its feed nicely regulated. The principle involved is, of course, the feeding of the water softening liquid in regulated quantities and the exact manner of such feeding is subject to variation.

Within the tank I prefer to provide an upright tube 36 located directly under the port 34 so as to catch the drops of softening liquid falling from the spout. This tube has connection, by means of an elbow 37, with the T 17. By this arrangement the softening liquid is fed into the tank with the water, but it is, of course, obvious that the liquid may be directly fed to the water in any suitable manner. The advantage of feeding the softening liquid directly into the feed water, particularly as said water flows, is manifest. This step causes a more thorough mixture and distribution of the liquid and prevents any water entering without carrying with it a proportion of water softening liquid.

The tube 36 is, of course, useful in conducting the softening liquid to the point of mixture and the inflowing water tends to create a suction down through said tube, thus inducing the flow of the liquid received from the regulator.

Where the quantity of water used in a given time is known, the regulator 26 may be adjusted to feed a definite quantity of softening liquid during the same period of time, and thus as the water is admitted to the tank the softening liquid is introduced in correct proportions to carry out the softening action.

It will be seen that the supply of water being controlled by the float 21 and the quantity of water used per minute being ascertained, the regulator 26 may be adjusted to feed the required number of drops per minute to soften the water as it is supplied to the tank. The supply of softening liquid, after once being regulated, becomes automatic. The handle yoke 29 may be swung down at any time to cut off the supply of liquid and the softening operation is thus under the control of the operator. I have found certain materials which may be combined and which I do not consider necessary to disclose, which produce a very efficient water softening liquid, leaving but a slight deposit in the bottom of the tank. This liquid is fed to the surface of the water and precipitates therethrough, thus acting upon the entire body of water without necessity of agitation or circulation.

So far as I am aware, I am the first to produce a simple water softening device capable of being used for supplying soft water to a boiler. The invention involves a system of feeding a water softening liquid to a body of water proportionate to the hardness and quantity of said water, either continuously or periodically, so as to produce soft water which may be used with tube boilers with little or no incrustation.

Various changes in the size and shape of the different parts, as well as modifications and alterations, may be made within the scope of the appended claims.

What I claim, is:

1. In a water softening device, a water storage tank, a reservoir for holding a water softening liquid mounted above the tank, a feed water pipe entering the tank, a float valve for controlling the supply of water to the tank, a regulator for discharging the liquid by gravity from the reservoir, and a tube within the tank receiving the liquid from the regulator and conducting it to the outlet of the float valve for introducing said liquid into the feed water stream.

2. In a water softening device, a water storage tank, a reservoir for holding a water softening liquid mounted above the tank, a feed water pipe entering the tank, a float valve for controlling the supply of water to the tank, a regulator for discharging the liquid from the reservoir by a drop-by-drop feed, and a tube within the tank alined with the liquid discharge from the regulator and communicating with the feed water pipe.

In testimony whereof I affix my signature.

STUART A. WIER.